United States Patent Office 2,921,931
Patented Jan. 19, 1960

2,921,931

METHODS FOR AGGLOMERATING POWDERED PIGMENTS

Donald W. Hayes, Akron, Ohio, assignor to The Goodyear Tire & Rubber Company, Akron, Ohio, a corporation of Ohio No Drawing. Application October 9, 1957
Serial No. 689,056

10 Claims. (Cl. 260—79.5)

This invention relates to methods of preparing powdered vulcanization accelerators in a new and more useful form. More specifically it relates to methods for agglomerating certain powdered accelerators.

The use of powdered organic accelerators in the compounding of natural and synthetic rubber presents certain problems to the rubber goods manufacturer. For example, the finely divided nature of the accelerator causes it to be blown into the air during production operations such as milling. This loss of the accelerator represents an increase in the cost of production. Also, any finely divided powder which is blown into the air surrounding production operations results in the contamination of other materials. Then, too, certain of these accelerators create serious health hazards in production operations because once blown into the air surrounding production operations, they cause irritation to the skin and nasal passages of the workmen exposed to the contaminated air. In addition, the fine powder-like nature of the pigments makes uniform dispersion difficult since the pigments tend to form lumps and flakes which stick to or cake on the mill rolls, thus increasing the time and effort required to form an intimate and thorough dispersion of the pigment in the rubber.

Efforts have been made to reduce the objectionable features of the powdered accelerators by converting the finely divided pigment particles into some form of agglomerate. It has usually been found that, in order to form such agglomerates, some additive must be used with the powdered pigment if the agglomerate, once formed, is to be stable. The additives frequently are materials which may be objectionable when ultimately mixed into the rubber compound with which the accelerator is to be used. Still other additives produce agglomerates which are relatively cohesive and not free-flowing, with the result that such agglomerates do not lend themselves to normal handling and weighing procedures. Other additives employed for preparing agglomerated accelerators are used in such large amounts that the rubber chemist is required to work with an unnecessarily "diluted" accelerator. Other treatments provide accelerators in agglomerated form which do not disperse readily into the rubber during the milling operation. Still other treatments result in an agglomerate which is not sufficiently stable to maintain its agglomerated form while it is transported from the manufacturer to the user. All of these objections have been overcome by preparing the powdered accelerators in an agglomerated form according to the methods of this invention.

One object of this invention is to provide for the preparation of powdered accelerators in an agglomerated form which will substantially eliminate the tendency of such accelerators to form dust which is blown into the surrounding air during storage, shipping, weighing, and processing operations. The use of these novel forms of accelerator results in a material saving to the manufacturer, the elimination of a source of contamination, and the elimination of a health hazard to which workmen handling such materials are exposed.

Another object of this invention is to provide for the preparation of these accelerators in an agglomerated form of such a nature that the individual particles of the agglomerate will hold together during normal handling operations and yet will disperse uniformly into and through the rubber during the milling operation.

Still another object is to provide for the preparation of agglomerated organic rubber vulcanization accelerators which disperse more rapidly into the rubber during milling than will the unagglomerated powdered accelerator itself.

Another object is to prepare agglomerated accelerators which are not cohesive but are free-flowing.

Another object is to prepare agglomerated organic accelerators with a minimum amount of diluent. Still another object is to prepare agglomerated accelerators which contain no materials deleterious to the compounding of the rubber with which the accelerator is to be used.

In accordance with this invention it has been found that these objects can be accomplished by mixing a minimum amount of a rubber latex with an aqueous slurry of the powdered accelerator under such conditions that the blending of the accelerator with the latex is completed before coagulation of the latex occurs.

The particular rubber accelerators to which this invention applies are tetramethyl thiuram disulfide, tetramethyl thiuram monosulfide, zinc dimethyl dithiocarbamage and zinc diethyl dithiocarbamate.

The particular rubber latices which are employed in the practice of this invention are natural rubber latex, polychloroprene latex, polybutadiene latex, the laticces of the rubbery copolymers of butadiene and styrene and the latices of the rubbery copolymers of butadiene and acrylonitrile. Of these, natural rubber latex and the latices of the rubbery copolymers of butadiene and styrene are preferred.

Representative of the water-soluble, non-volatile stabilizers which are used in the practice of this invention are sodium chloride, sodium hydroxide and potassium hydroxide. Of these, sodium chloride is preferred.

In order to prevent the premature coagulation of the rubber latex when it is mixed with the slurry of powdered accelerator, the solids content of the latex is maintained at a maximum of 10% by weight and a water-soluble, non-volatile stabilizer or preservative for the latex is added to the slurry.

It has been found that the amount of stabilizer required to prevent the premature coagulation of the latex should be at least 25 parts by weight of the particular accelerator used. While the amount of stabilizer may range up to 100 or more parts per 100 parts of accelerator, best results have been obtained in the range of from 50 to 60 parts stabilizer per 100 parts accelerator. The dilution of the latex and the presence of the stabilizer in the slurry are necessary since the powdered accelerators from which the aqueous slurry is made usually contain a small amount of occluded acid which will cause premature coagulation of the latex as it is added to and mixed with the slurry.

The latex should also contain an antioxidant, and preferably a non-discoloring antioxidant, in order to preserve the rubber content of the agglomerate during storage.

The antioxidants which are employed are those commonly used with natural or synthetic rubber latex such as phenyl beta naphthyl amine, octylated diphenyl amine, N,N'-di (beta naphthyl) para-phenylene diamine and the reaction product of acetone and aniline. It is preferred, however, that the antioxidant used be one which does not discolor the agglomerated accelerator. Representative of these non-discoloring antioxidants are the styrenated and alkylated phenols and the phenyl phosphites.

In the preparation of the agglomerate it is preferred that a minimum amount of latex be employed for the reason that the users of the accelerator prefer to employ one which is as nearly chemically pure as possible and which contains a minimum amount of diluent. It has been found that the latex required to produce satisfactory agglomerates of the specific accelerators mentioned above should provide at least 4 parts by weight of rubber hydrocarbon per 100 parts by weight of the powdered accelerator. While satisfactory agglomerates can be produced using as much as 10 parts by weight of rubber hydrocarbon per 100 parts by weight of acclerator, it is preferred that from 4 to 6 parts by weight be used to minimize the dilution of the accelerator by the rubber hydrocarbon.

After the diluted latex containing the intioxidant is thoroughly mixed with the aqueous slurry containing the stabilizer and the powdered accelerator, the mixture is heated to approximately 100° F.–180° F. in order to coagulate the latex. After coagulation has been completed, the excess water is removed by filtration or decanting, using additional wash-water as required to remove the water-soluble stabilizer. The water content of the original mixture is reduced so that the mixture contains approximately from 20 to 40% water by weight of the total mixture. In this form the mixture has a paste-like consistency which lends itself readily to the formation of agglomerates by means of any conventional type of pellet-forming apparatus such as a granulator, molding press, corrugated rolls or an extruder. The preferred method for forming the agglomerate is to extrude the paste-like mixtures through a die provided with a plurality of small cylindrical holes. The mixture leaves the extruder in the form of strings or rods which are collected, preferably on a moving belt, and then dried. The dried agglomerate contains the solids content of the latex as the only diluent of the otherwise pure accelerator.

Further details of the practice of this invention are set forth in the following examples which are to be interpreted as representative rather than restrictive of the scope of this invention.

*Example 1*

Water (1000 grams) was added to 46 grams of a latex prepared from 71% butadiene and 29% styrene. The latex contained 21.53% rubber hydrocarbon and 0.27% of a styrenated phenol antioxidant by weight. This diluted latex was added to an aqueous slurry of 2000 grams of water, 100 grams of sodium chloride and 190 grams of tetramethyl thiuram disulfide. This combined mixture was then throughly agitated and heated by steam to 180° F. until the latex had been coagulated. The excess water was decanted from the mixture and the residue was washed four times with water, the excess water being decanted after each washing. After the last washing operation, the mixture was filtered, leaving a residue of paste-like consistency. The paste-like mixture was extruded into string-like or rod-like shape and dried at 125° F.

*Example 2*

The same procedure was followed as for Example 1 except zinc dimethyl dithiocarbamate was used in place of tetramethyl thiuram disulfide and the mixture was heated to 100° F. to coagulate the latex.

*Example 3*

The same procedure was followed as for Example 1 except zinc diethyl dithiocarbamate was used in place of tetramethyl thiuram disulfide.

The agglomerated accelerators prepared according to Examples 1 through 4 formed stable, non-dusty agglomerates which were free-flowing. Mixing the agglomerates with rubber on a mill and in a banbury in accordance with normal practice showed that the agglomerates dispersed more rapidly and more uniformly into the rubber than did the dry powdered accelerators from which the agglomerates were made.

Thus, it will be seen that by following the practices of this invention, it is possible to produce a free-flowing, stable, non-dusty, agglomerated accelerator containing only a minimum amount of diluent. The agglomerates themselves maintain their stability during storage and handling operations and yet disperse rapidly and uniformly into and through the rubber compound with which they are used.

This application is a continuation-in-part of my copending application Serial No. 415,950, filed March 12, 1954, now abandoned.

While certain representative embodiments and details have been shown for the purpose of illustrating the invention, it will be apparent to those skilled in this art that various changes and modifications may be made therein without departing from the spirit or scope of the invention.

I claim:

1. A method for preparing an agglomerated compounding ingredient for rubber which comprises forming an aqueous slurry of a powdered vulcanization accelerator selected from the group consisting of tetramethyl thiuram disulfide, tetramethyl thiuram monosulfide, zinc dimethyl dithiocarbamate and zinc diethyl dithiocarbamate, a water-soluble, non-volatile stabilizer selected from the group consisting of sodium chloride, sodium hydroxide and potassium hydroxide and a latex containing a maximum of 10% rubber hydrocarbon by weight, and an intioxidant for the rubber portion of said latex, said latex being selected from the group consisting of natural rubber latex, polychloroprene latex, polybutadiene latex, the latices of the rubbery copolymers of butadiene and styrene and the latices of the rubbery copolymers of butadiene and acrylonitrile, the powdered vulcanization accelerator being present in an amount of 100 parts by weight, the latex being present in an amount to provide from 4 to 10 parts rubbery hydrocarbon by weight per 100 parts of said powdered vulcanization accelerator, the non-volatile, water-soluble stabilizer being present in an amount of at least 25% by weight of powdered vulcanization accelerator, water being present in said aqueous slurry in an amount that the weight ratio of water to powdered vulcanization accelerator is at least 10.5 to 1, mixing the aqueous slurry until the rubber latex coagulates, removing excess water to reduce the total water content of the mixture to range from about 20% to about 40% by weight of the total mass, forming agglomerates of the mixture, drying and collecting the dried agglomerates.

2. The method for preparing an agglomerated compounding ingredient for rubber which comprises mixing (A) a latex containing a maximum of 10% rubbery hydrocarbon by weight and a styrenated phenol antioxidant and being selected from the group consisting of natural rubber latex, polychloroprene latex, polybutadiene latex, the latices of the rubbery copolymers of butadiene and styrene and the latices of the rubbery copolymers of butadiene and acrylonitrile with (B) an aqueous slurry of a powdered vulcanization accelerator selected from the group consisting of tetramethyl thiuram disulfide, tetramethyl thiuram monosulfide, zinc dimethyl dithiocarbamate and zinc diethyl dithiocarbamate and a water-soluble, non-volatile stabilizer selected from the group consisting of sodium chloride, sodium hydroxide and potassium hydroxide, the vulcanization accelerator being present in an amount of 100 parts by weight, the non-volatile, water-soluble stabilizer being present in an amount of at least 25% by weight of the powdered vulcanization accelerator, water being present in an amount so that the weight ratio of water to the powdered vulcanization accelerator is at least 10.5 to 1, the latex being present in an amount to provide from 4 to 10 parts rubbery hydrocarbon by weight per 100 parts of powdered vulcanization accelerator, mixing the aqueous slurry until the rubber latex coagulates, removing excess water to reduce the total water content of the mixture to range from about 20% to about 40% by weight of the total mass, forming agglomerates of the mixture, drying and collecting said agglomerates.

3. The method according to claim 1 in which the agglomerates are formed by extruding the mixture in the form of long strings or rods.

4. The method according to claim 3 in which the mixture contains from 4 to 6% rubber hydrocarbon content by weight of said accelerator and the anti-oxidant is a styrenated phenol.

5. The method according to claim 3 in which the water-soluble, non-volatile stabilizer is sodium chloride.

6. The method according to claim 5 in which the water-soluble, non-volatile stabilizer is present in an amount at least 50 parts by weight per 100 parts by weight of said vulcanization accelerator.

7. The method according to claim 6 in which a latex of a rubbery copolymer of butadiene and styrene is employed.

8. The method according to claim 6 in which the natural rubber latex is employed.

9. The method according to claim 2 in which a latex of a rubbery copolymer of butadiene and styrene is employed in an amount such that the rubber hydrocarbon content shall be from 4 to 6% by weight of said accelerator, and the water-soluble, non-volatile stabilizer is sodium chloride in an amount ranging from 50 to 60 parts per 100 parts of said accelerator and in which the agglomerates are formed by extruding the mixture in the form of strings and rods.

10. The method according to claim 9 in which the powdered vulcanization accelerator is tetramethyl thiuram disulfide.

References Cited in the file of this patent

UNITED STATES PATENTS

| | | |
|---|---|---|
| 2,555,068 | Van Veersen | May 29, 1951 |
| 2,615,009 | St. John | Oct. 21, 1952 |
| 2,640,088 | Gleen | May 26, 1953 |
| 2,647,887 | Goppel | Aug. 4, 1953 |